US008688711B1

(12) United States Patent  
Chevalier

(10) Patent No.: US 8,688,711 B1
(45) Date of Patent: *Apr. 1, 2014

(54) CUSTOMIZABLE RELEVANCY CRITERIA

(75) Inventor: Pierre-Yves Chevalier, Biviers (FR)

(73) Assignee: EMC Corporation, Hopkinton, MA (US)

( * ) Notice: Subject to any disclaimer, the term of this patent is extended or adjusted under 35 U.S.C. 154(b) by 651 days.

This patent is subject to a terminal disclaimer.

(21) Appl. No.: 12/416,004

(22) Filed: Mar. 31, 2009

(51) Int. Cl.
*G06F 7/00* (2006.01)

(52) U.S. Cl.
USPC ............................ 707/748; 707/749; 707/752

(58) Field of Classification Search
None
See application file for complete search history.

(56) References Cited

U.S. PATENT DOCUMENTS

| | | | |
|---|---|---|---|
| 6,311,178 B1 * | 10/2001 | Bi et al. ........................ 707/706 |
| 6,826,507 B2 * | 11/2004 | Kroboth et al. ............... 702/127 |
| 6,873,990 B2 * | 3/2005 | Oblinger .............................. 1/1 |
| 6,911,978 B2 * | 6/2005 | Nomiyama et al. ........... 345/440 |
| 7,062,478 B1 | 6/2006 | Huelsman et al. |
| 7,373,403 B2 * | 5/2008 | Kroboth et al. ............... 709/224 |
| 7,401,093 B1 | 7/2008 | Hamilton et al. |
| 7,432,927 B2 * | 10/2008 | Iguchi et al. .................. 345/440 |
| 7,603,391 B1 | 10/2009 | Federwisch et al. |
| 7,613,799 B2 * | 11/2009 | Higuchi et al. ............... 709/223 |
| 7,831,613 B2 * | 11/2010 | Jain et al. ...................... 707/778 |
| 7,882,001 B2 * | 2/2011 | Nahum ........................... 705/35 |
| 2001/0037212 A1 * | 11/2001 | Motosuna et al. ................ 705/1 |
| 2002/0038299 A1 * | 3/2002 | Zernik et al. ..................... 707/3 |
| 2003/0004932 A1 * | 1/2003 | Chow et al. ...................... 707/3 |
| 2003/0076323 A1 * | 4/2003 | Nomiyama et al. ........... 345/440 |
| 2003/0233525 A1 | 12/2003 | Reeves |
| 2004/0059870 A1 | 3/2004 | Ash et al. |
| 2005/0055340 A1 * | 3/2005 | Dresden ............................ 707/3 |
| 2005/0108082 A1 * | 5/2005 | Jenkinson ........................ 705/10 |
| 2005/0108268 A1 * | 5/2005 | Saintry et al. ................. 707/102 |
| 2005/0114324 A1 * | 5/2005 | Mayer ............................... 707/3 |
| 2005/0251432 A1 | 11/2005 | Barker et al. |
| 2005/0268068 A1 | 12/2005 | Ignatius et al. |
| 2006/0075007 A1 | 4/2006 | Anderson et al. |
| 2006/0136825 A1 | 6/2006 | Cory et al. |
| 2006/0271622 A1 | 11/2006 | Scheid |
| 2007/0024490 A1 * | 2/2007 | Carter et al. .................... 342/36 |
| 2007/0073748 A1 | 3/2007 | Barney |
| 2007/0112759 A1 * | 5/2007 | Kulakow et al. .................. 707/5 |
| 2007/0208826 A1 | 9/2007 | Devolites |
| 2008/0028334 A1 * | 1/2008 | De Mes ......................... 715/781 |
| 2008/0091894 A1 | 4/2008 | Retnamma et al. |
| 2008/0154878 A1 * | 6/2008 | Rose et al. ........................ 707/5 |
| 2008/0177994 A1 * | 7/2008 | Mayer ............................. 713/2 |
| 2008/0195807 A1 | 8/2008 | Kubo et al. |
| 2008/0215571 A1 | 9/2008 | Huang et al. |
| 2008/0270203 A1 * | 10/2008 | Holmes et al. ................... 705/7 |
| 2008/0294631 A1 * | 11/2008 | Malhas et al. .................... 707/5 |

(Continued)

*Primary Examiner* — Matt Kim
*Assistant Examiner* — Hua Lu
(74) *Attorney, Agent, or Firm* — Theodore A. Chen; Krishnendu Gupta

(57) ABSTRACT

A method, article of manufacture, and apparatus for displaying search results are disclosed. In an embodiment, this may comprise receiving search results, for a search result, receiving information about search result scores according to a plurality of criteria, allowing a user to select criteria, using the selected criteria to create spokes in a radar chart, associating the search result scores with the spokes in the radar chart, creating a star in the radar chart based on the association of search result scores with the spokes, and displaying the radar chart. Different weight may be given to each search result score. Multiple search results may be displayed in one radar chart, or multiple radar charts may be used.

14 Claims, 7 Drawing Sheets

(56) References Cited

U.S. PATENT DOCUMENTS

| | | | |
|---|---|---|---|
| 2009/0070490 A1* | 3/2009 | Dozier et al. | 709/248 |
| 2009/0083256 A1* | 3/2009 | Thompson et al. | 707/5 |
| 2009/0083257 A1* | 3/2009 | Bargeron et al. | 707/5 |
| 2009/0083563 A1 | 3/2009 | Murase | |
| 2009/0094053 A1* | 4/2009 | Jung et al. | 705/2 |
| 2009/0198560 A1* | 8/2009 | Nahum | 705/10 |
| 2009/0248675 A1* | 10/2009 | Kawabata et al. | 707/5 |
| 2010/0125573 A1* | 5/2010 | Venolia | 707/722 |

* cited by examiner

Web  Images  Maps  News  Video  Gmail  more ▼

Google  [radar chart]  [Search]  Advanced Search
                                  Preferences

Web Images

Radar chart - Wikipedia, the free encyclopedia
A radar chart is a graphical method of displaying multivariate data in the form of a two-
dimensional chart of three or more quantitative variables ...
en.wikipedia.org/wiki/Radar_chart - 31k - Cached - Similar pages Using a Radar chart in Excel to see the big picture
An Excel chart which might allow one to see the "Big Picture" more quickly is a **Radar
chart. To demonstrate the use of this type of chart**, we will compare ...
www.internet4classrooms.com/excel_radar.htm - 12k - Cached - Similar pages

Radar chart or Spiderweb Chart
Radar charts, also called spiderweb charts, are useful for rating an item or items along 3 or
more axes, eg the cost, quality of faculty, campus facilities, ...
www.skymark.com/resources/tools/radar_charts.asp - 7k - Cached - Similar pages Image results for radar chart - Report images

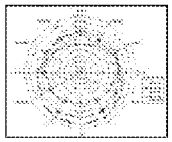   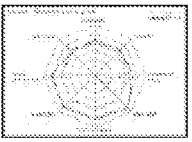

[PDF] RADAR CHART/SPIDER CHART What it is: When to use it: How to use it:
File Format: PDF/Adobe Acrobat - View as HTML
A radar chart graphically shows the size of the gaps among five to ten ... A radar chart
shows how a team has evaluated a number of organizational ...
web2.concordia.ca/Quality/tools/23radar.pdf - Similar pages Custom Radar Chart
Apr 13, 2008 ... A Radar chart, also known as a spider chart, visually compares several
entities (products, organizations, investment opportunities, ...
www.tushar-mehta.com/excel/software/custom_radar/ - 38k - Cached - Similar pages Present your data in a radar chart - Help and How-to - Microsoft ...
A radar chart, also known as a spider chart or a star chart because of its appearance, plots
the values of each category along a separate axis that starts ...
office.microsoft.com/en-us/help/HA102186721033.aspx - 54k - Cached - Similar pages

FIG. 1
PRIOR ART

CUSTOMIZABLE RELEVANCY CRITERIA

CROSS-REFERENCE TO RELATED APPLICATIONS

This application is related to co-pending U.S. patent application Ser. No. 12/415,989 for Relevancy Radar and filed concurrently herewith, which is incorporated herein by reference for all purposes; co-pending U.S. patent application Ser. No. 12/416,019 for Color Coded Radars and filed concurrently herewith, which is incorporated herein by reference for all purposes.

FIELD OF THE INVENTION

The present invention relates generally to search engines, and more particularly, to systems and methods of efficiently displaying search results.

BACKGROUND OF THE INVENTION

Conventional search engines operating in a networked computer environment such as the World Wide Web or in an individual computer can provide search results in response to entry of a user's search query. In many instances, the search results are ranked in accordance with the search engine's scoring or ranking system or method. For example, conventional search engines score or rank documents of a search result for a particular search query based on the contents of the documents, such as on the number of times a keyword or particular word or phrase appears in each document in the search results. Documents include, for example, web pages of various formats, such as HTML, XML, XHTML; Portable Document Format (PDF) files; and word processor and application program document files. Other search engines base scoring or ranking on more than the content of the document. For example, one known method, described in an article entitled "The Anatomy of a Large-Scale Hypertextual Search Engine," by Sergey Brin and Lawrence Page, assigns a degree of importance to a document, such as a web page, based on the link structure of the web page. Other conventional methods involve selling a higher score or rank in search results for a particular query to third parties that want to attract users or customers to their websites.

If an Internet search engine returns more than one search result in response to a search query, the search results may be displayed as a list of links to the documents associated with the search results. A user may browse and visit a website associated with one or more of the search results to evaluate whether the website is relevant to the user's search query. For example, a user may manipulate a mouse or another input device and "click" on a link to a particular search result to view a website associated with the search result. In many instances, the user will browse and visit several websites provided in the search result, clicking on links associated with each of the several websites to access various websites associated with the search results before locating useful or relevant information to address the user's search query.

If the user is not satisfied with the initial search results, the user may decide to change or modify the search query to a second, typically-related query and obtain a new or similar set of search results. After inputting the second query and receiving new search results, the user may manipulate a mouse or another input device and "click" on a link to a particular search result to view a website associated with the search result. As before, the user may browse and visit several websites associated with the search results returned for the second query by "clicking" on links associated with the websites returned in the search results.

One such popular search engine utilizing the above methods is Google. Other well known search engines include Yahoo!, Live Search, AOL, and Ask, among others.

There are a plethora of less well known search engines, including Kartoo. Search engines such as Kartoo employ a visual display to show relations between various search results. For example, if a search query was "web 2.0," Kartoo would return results grouping certain results by relation, such as technical, definition, phrase, wiki, contents, etc.

Google was incorporated in 1998, over ten years ago. Yahoo! pre-dates Google, starting its search services in 1995. Though these two search engines have dominated the search market for well over a decade, Yahoo! and Google were not the first search engines. Search engines and algorithms have existed well before then.

The Windows operating system has a built in search feature which can locate files in a local computer system. Earlier operating systems, such as DOS, also provided basic search features to locate files in a local computer system. Search engines and algorithms have been used in a variety of environments for decades. Their use and applicability are well known.

However, current search engines and algorithms do not fully consider the user's context or intent. There is a need, therefore, for an improved method, article of manufacture, and apparatus for displaying search results.

BRIEF DESCRIPTION OF THE DRAWINGS

The present invention will be readily understood by the following detailed description in conjunction with the accompanying drawings, wherein like reference numerals designate like structural elements, and in which:

FIG. 1 is a diagram of search results displayed by prior art.

DETAILED DESCRIPTION

Figure 2:
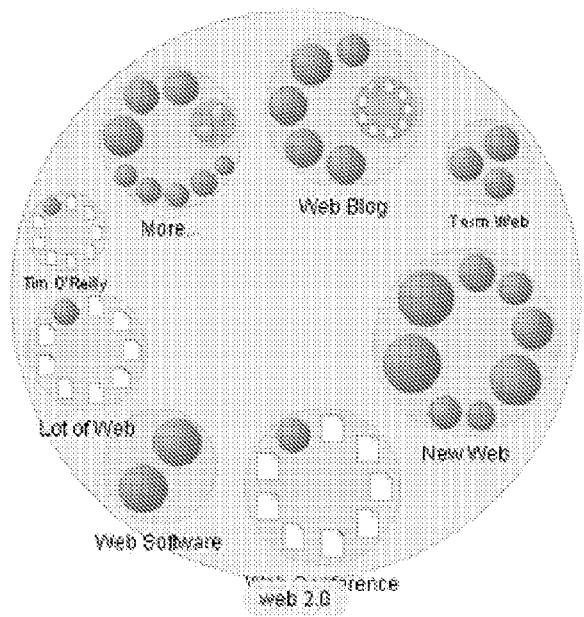
FIG. 2 is a diagram of search results displayed by prior art.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a system in the form of a storage system configured to store files, but it should be understood that the principles of the invention are not limited to data storage systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Disclosed herein are a method and system to efficiently display search results. Generally, search results are displayed according to a rank or score. For example, a search algorithm may score a document based on the number of keywords found in the document. Additional search criteria may be used in conjunction with keywords, such as the date of the document (newer documents may receive a higher score), number of links to the document, etc. All of the scores are then aggregated into one final score or rank. Some search engines use this final rank to determine the order in which search results appear. For example, a search result yielding a high rank may be placed in a prominent location on the user's screen. This prominent location may be at the top of the user's screen. A search result yielding a low rank may be placed in a less prominent location. This less prominent location may be at the bottom of the user's screen, or buried deep under pages of search results. Placing high ranking results in a prominent location allows users to easily see what the "best" results are.

Figure 3:
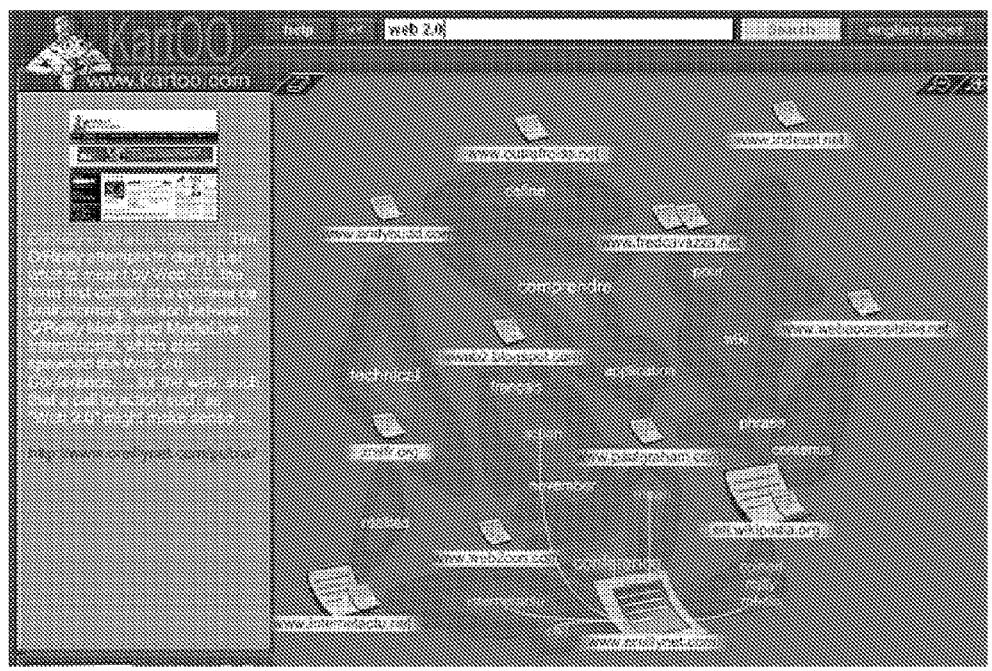
FIG. 3 is a diagram of search results displayed by prior art.

Newer search engines go beyond displaying a text list of search results. Grokker and Kartoo are examples of search engines which display search results graphically. Grokker displays search results in clusters. Depending on the search query, such clusters in Grokker may include "web software," "web blog," "term web," among others. Kartoo shows the relationships between different search results. Again, depending on the search query, such relationships may include "wiki," "definitions," "technical," among others. FIGS. 1, 2, and 3 illustrate such search results in the prior art. By displaying search results graphically, search engines such as Grokker and Kartoo allow users to make more informed decisions about which search result to pursue. However, such search results are not very intuitive to navigate. As seen by FIG. 2 and FIG. 3, graphical search results may be very involved and require more time to understand than a simple text list of search results.

Aggregating search criteria into one single score or rank has been used for decades by several search engines. As evidenced by Google's and Yahoo!'s success, such a method of aggregation may be extremely effective. Newer search engines, such as Grokker and Kartoo, also do not show search criteria in the search results—they display search results using graphics instead of text. Though successful and well-tested, single value search results fail to capture the context and the intent of the user. Basically, the user trusts the search engine and clicks on the "top" or "best" hit. For example, one search result may have a rank of 90%. A second search result may have a rank of 89%. According to conventional search engines and algorithms, the search result with a rank of 90% would be "better." A user would not know how or why the rank was determined.

The present invention uses radar charts to enhance the display of search results. In some embodiments, users define search criteria that are represented by each spoke in the radar chart. The radar chart, or relevancy radar, may then be displayed next to a search result. By using a relevancy radar to enhance the display of search results, users will now know the full context of the search results, and are better positioned to determine which search result is "best."

The radar chart is a graphical method of displaying data having multiple variables, and is also known as a web chart, spider chart, or star chart, among others. Radar charts consist of a sequence of spokes, called radii, with each spoke representing one of the variables. The length of a spoke is proportional to the magnitude of the source for the data point relative to the maximum magnitude of the source across all data points. A line is drawn connecting the data point for each spoke. This gives the radar chart a star-like appearance, thus occasionally being referred to as a star chart.

Radar charts are a useful way to display multiple data sets. Each data set is represented as a "star" on the radar chart. By overlapping "stars" on top of each other, an observer can easily detect patterns or trends between the data sets.

Figure 4:
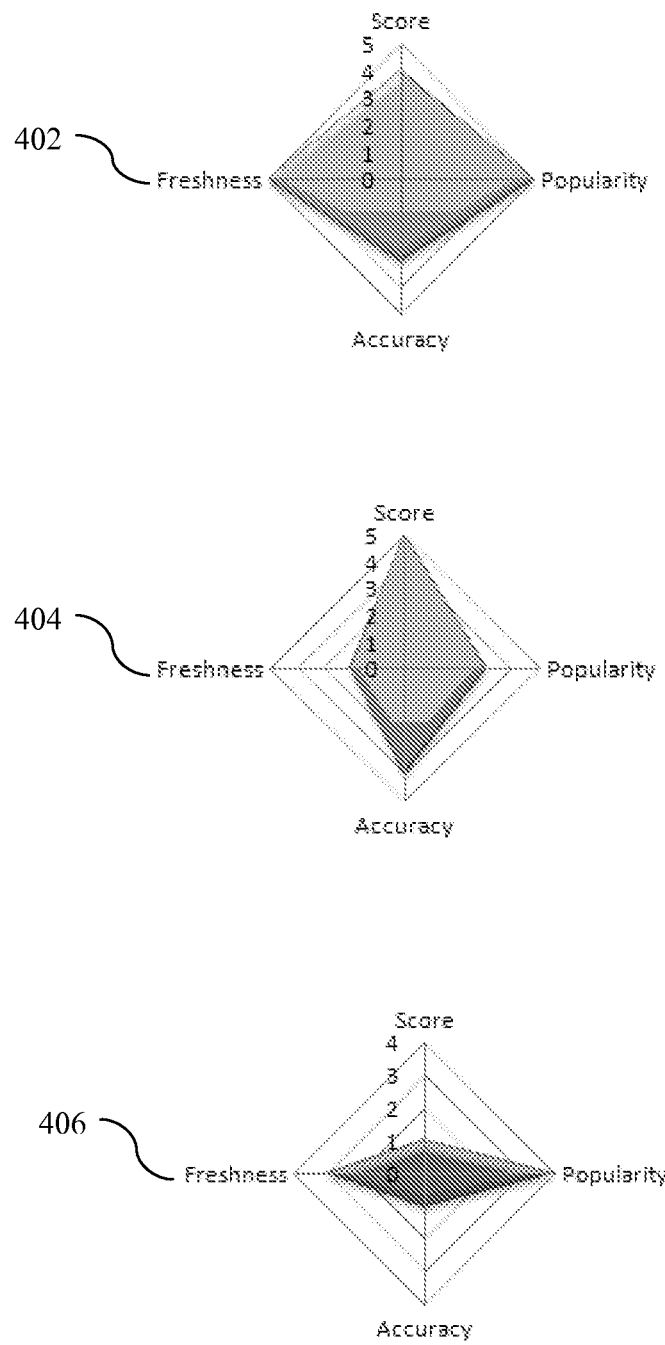
FIG. 4 is a diagram of an embodiment of search results displayed in accordance with the invention.

FIG. 4 illustrates an embodiment of the current invention. The relevancy radars illustrated in FIG. 4 have four spokes, each with a maximum value of 5. The four spokes are Score, Popularity, Accuracy and Freshness. Popularity may refer to the number of links to a search result document. Accuracy may refer to number of keywords found in the document.

Freshness may refer to the date the document was last modified. Score may be an average of the three other spokes.

Search result 402 shows a document having very high popularity and freshness, but an average amount of keywords. Search result 404 shows a document having high accuracy, average popularity, and low freshness. However, the score remains high because a user may have indicated to place more emphasis on accuracy. Search result 406 has very high popularity, high freshness, but low accuracy. The score remains low because a user may have placed more emphasis on accuracy.

Though FIG. 4 illustrates an embodiment with four spokes, the relevancy radar need not be limited to four spokes. Depending on user needs, relevancy radars may have more or less spokes. More spokes allow for additional search criteria, thus allowing users to more intelligently evaluate search results. Such additional search criteria may include number of reads, date of creation, language, size, type of file, department, owner of file, among others. The "department" and "owner" search criteria may be especially useful when searching for a file in a corporate environment.

However, if there are too many spokes in a relevancy radar, such a radar may overwhelm users and render the radar chart inaccessible. In some embodiments, users may suppress spokes from appearing in a radar chart, although the criteria for the suppressed spokes may be still be used (e.g. as part of a composite score used by another spoke). Users may also alter the size of the radar chart to increase accessibility. Such alterations may include increasing the length of each spoke, effectively "stretching" the radar chart, increasing the intensity of the color of a star in the radar chart, or changing the hue of the color of the star in the radar chart. If a radar chart is placed in a non-preferred location (e.g. one user likes radar charts to the right of search results, another user likes radar charts to the left of search results), a user may move the radar chart to a preferred location.

Further, the "stars" of a relevancy radar need not be separated into separate radars. Though impractical to overlap hundreds of search result "stars" on a single radar, it may be preferable in instances where there are not many search results. For example, if a user is searching for a family picture stored in a local computer, a search query of "family" may return only a few search results, and overlapping "stars" may be preferable.

Figure 5:
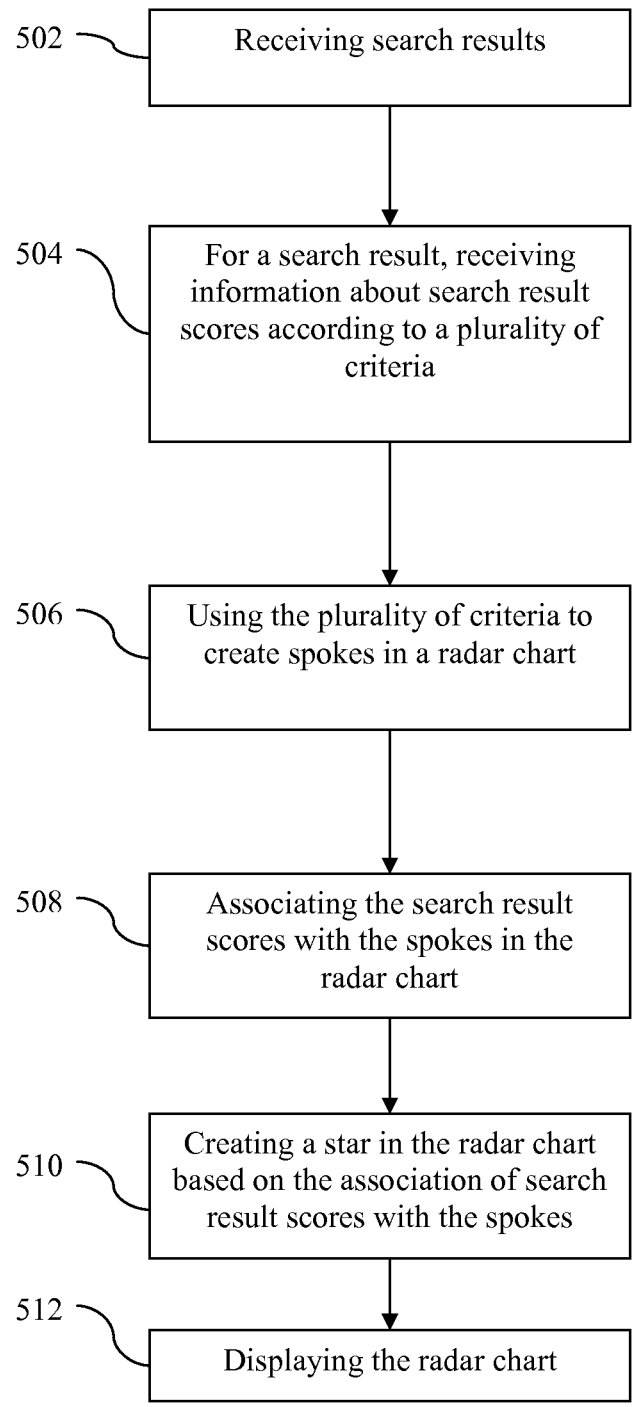
FIG. 5 is a flowchart of how to display search results in accordance with the invention.

FIG. 5 illustrates a process for displaying search results in some embodiments of the invention, comprising receiving search results in step 502, for a search result, receiving information about search result scores according to a plurality of criteria in step 504, using the plurality of criteria to create spokes in a radar chart in step 506, associating the search result scores with the spokes in the radar chart in step 508, creating a star in the radar chart based on the association of search result scores with the spokes in step 510, and displaying the radar chart in step 512.

Figure 6:
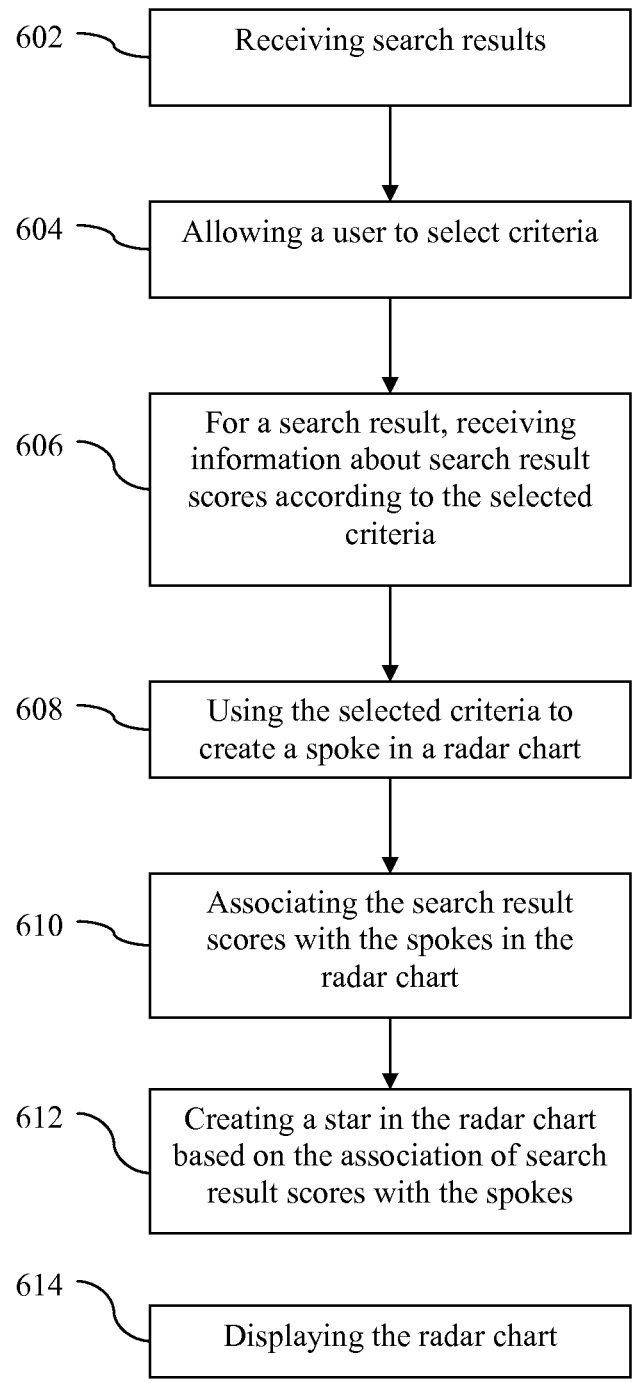
FIG. 6 is a flowchart of how to display search results in accordance with the invention.

FIG. 6 illustrates a process in which a user may customize the display of search results in some embodiments of the invention, comprising receiving search results in step 602, allowing a user to select criteria in step 604, for a search result, receiving information about search result scores according to the selected criteria in step 606, using the selected criteria to create spokes in a radar chart in step 608, associating the search result scores with the spokes in the radar chart in step 610, creating a star in the radar chart based on the association of search result scores with the spokes in step 612, and displaying the radar chart in step 614.

Radar charts may use color to distinguish an individual data set from a plurality of data sets. For example, a radar chart may contain five data sets, or "stars." In order to readily distinguish between the five data sets, each data set may be given a unique color. The first data set may be arbitrarily colored red, the second data set may be colored orange, the third data set may be colored yellow, and so forth. Users may change these color designations.

In some embodiments of the present invention, color may be used to convey the quality of search results. FIG. 4 illustrates how colors can quickly convey the score and quality of a search result. Search result 402 is green, indicating a high score and good result. Search result 404 is orange, indicating an average score and a mediocre result. Search result 406 is red, indicating low score and a bad result.

A document that was recently modified may have a search result "star" that is colored green, indicating a "good" search result. A document that has not been modified in over a year may have a search result "star" that is colored red, indicating a "bad" search result. With a mere glance at the differently colored search result "stars," a user can easily determine which results are "good" and which are "bad." This depends on which search criteria are emphasized. If date of modification did not have significant weight as a search criterion, the date of modification would not significantly alter the color of the search result "star."

Figure 7:
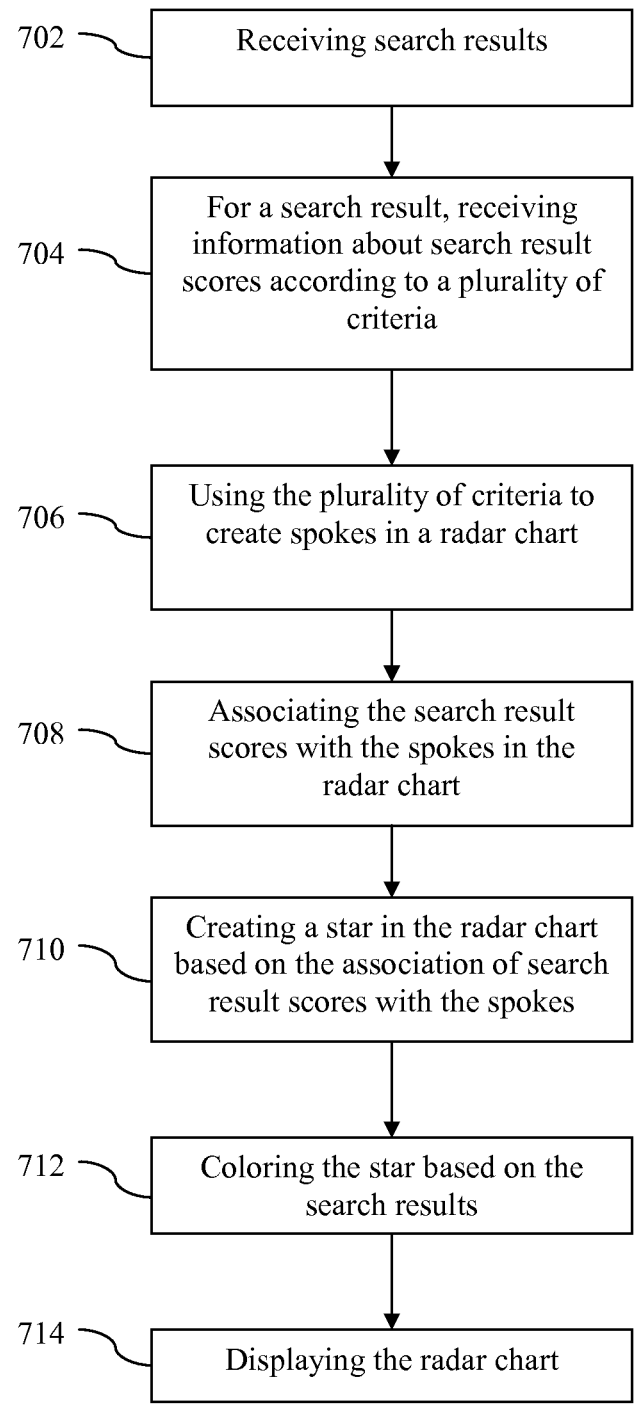
FIG. 7 is a flowchart of how to display search results in accordance with the invention.

FIG. 7 describes a process in which color may be used to display search results, comprising receiving search results in step 702, for a search result, receiving information about search result scores according to a plurality of criteria in step 704, using the plurality of criteria to create spokes in a radar chart in step 706, associating the search result scores with the spokes in the radar chart in step 708, creating a star in the radar chart based on the association of search result scores with the spokes in step 710, coloring the start based on the search results in step 712, and displaying the radar chart in step 714.

In some embodiments, a relevancy radar is computed using four criteria (or four spokes): score, freshness, accuracy and popularity. The relevancy radar's function may be defined as:

$$F\text{radar}(\text{result}) = (W\text{score}*\text{score} + W\text{fresh}*\text{freshness} + W\text{acc}*\text{accuracy} + W\text{pop}*\text{popularity}) / (W\text{score} + W\text{fresh} + W\text{acc} + W\text{pop})$$

Where:
Wscore is the relative weight of the score criteria [bounded between 0 and 1]
Wfresh is the relative weight of the freshness criteria [bounded between 0 and 1]
Wacc is the relative weight of the accuracy criteria [bounded between 0 and 1]
Wpop is the relative weight of the popularity criteria [bounded between 0 and 1]
A rule which may govern how color is associated to a score is presented by the following:
Green when $4 <= F\text{radar}(\text{result}) <= 5$
Orange when $2.5 < F\text{radar}(\text{result}) < 4$
Red when $0 <= F\text{radar}(\text{result}) <= 2.5$
The following table illustrates how color may be associated a criteria's weight.

|  | Default Weights (Policy 1) | Weight Accuracy (Policy 2) | Weight Popularity (Policy 3) |
| --- | --- | --- | --- |
| Score | 1 | 0 | 0.5 |
| Popularity | 1 | 0 | 1 |
| Accuracy | 1 | 1 | 0 |
| Freshness | 1 | 0.5 | 0.5 |

-continued

|  | Default Weights (Policy 1) | Weight Accuracy (Policy 2) | Weight Popularity (Policy 3) |
|---|---|---|---|
| Fradar(Result1) | 2.3 | 1.7 | 3.0 |
| Fradar(Result2) | 3.5 | 3.3 | 3.3 |
| Fradar(Result3) | 4.3 | 3.7 | 4.8 |

Policy 1 gives equal weight to the four criteria. Policy 2 gives more weight to accuracy. Policy 3 gives more weight to popularity. The resulting color from each policy may be noticeably different. By applying policy 1, Fradar(Result1) is 2.3, or red using the above formula. This indicates a "bad" search result. By applying policy 2, Fradar(Result1) is 1.7, or red using the above formula. This again indicates a "bad" search result. However, by applying policy 3, Fradar(Result1) is 3.0, or orange using the above formula. This indicates an "average" search result.

In some embodiments, a general formula for determining a relevancy radar's color may be expressed as follows:

$$fradar(x) = \frac{\sum_{n=1}^{m}(w_n \cdot s_n(x))}{\sum_{n=1}^{m} w_n}$$

$$fcolor(x) = \begin{cases} red, & 0 < fradar(x) \le 2.5 \\ orange, & 2.5 < fradar(x) < 4.0 \\ green, & 4.0 \le fradar(x) \le 5.0 \end{cases}$$

where:
m is the number of spokes;
wn is the weight of the spoke n; and
sn(x) is the score of the result for spoke n The above formula uses pre-selected ranges for color. However, the range is arbitrary, and may vary greatly. For example, if the range is small enough, and the number of colors large enough, a color gradient may be used instead of discrete colors. Further, users may customize the manner in which colors are used. For example, a user may prefer blue to represent a "good" result, while another user may select white to represent a "good" result.

Color may also be used to substitute for a spoke. For example, in FIG. 4, the score spoke may be removed, allowing the color to represent the score. By simply looking at the color, a user may intuitively know the score without looking at a score spoke. Green indicates a high score, orange represents an average score, and red indicates a low score.

The relevancy radar approach offers many advantages over the tried and tested single rank textual or graphical search display. The relevancy radar offers a very compact visual representation that combines multiple judging criteria in an easily accessible location. The user is readily able to identify which stars (or shape of stars) are "good," giving more weight to search criteria most important to the user. For example, one user may place more emphasis on newer documents, while another user may place more emphasis on a document's popularity. These two users will define "good" stars very differently, and may pursue different search results based on what they define as "good." Current search engines and algorithms do not allow for this since current search engines and algorithms tell the user what is "good."

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for displaying search results according to customizable relevancy criteria, comprising:
   receiving search results;
   for a search result, receiving information about search result scores according to a plurality of relevancy criteria;
   allowing a user to select relevancy criteria to be applied to search result scores;
   applying a color designation to the search result scores, wherein the color designation includes one from the group comprising giving equal weight to each selected criterion, assigning more weight to a particular criterion, and assigning less weight to a particular criterion;
   using the selected relevancy criteria to create spokes in a radar chart;
   associating the search result scores with the spokes in the radar chart;
   creating a star in the radar chart based on the association of search result scores with the spokes;
   displaying the radar chart using a color selected according to the color designation; and
   modifying the displayed radar chart, wherein modifying the displayed radar includes one from the group comprising suppressing a spoke and adding a spoke.

2. The method as recited in claim 1, further comprising allowing a user to add criteria to the selected criteria.

3. The method as recited in claim 1, further comprising allowing a user to remove criteria from the selected criteria.

4. The method as recited in claim 2, wherein the added criteria is a composite of a plurality of the selected criteria.

5. The method as recited in claim 1, wherein a plurality of the selected criteria is used to create one of the spokes in a radar chart.

6. The method as recited in claim 5, further comprising allowing a user to give more weight to one of the plurality of the selected criteria when creating one of the spokes in a radar chart.

7. The method as recited in claim 1, further comprising creating a spoke from a composite of a plurality of search result scores.

8. The method as recited in claim 7, wherein creating a spoke from a composite of a plurality of spokes includes allowing a user to give more weight to one of the plurality of spokes.

9. The method as recited in claim 1, further comprising allowing a user to change the weight of a search result score.

10. The method as recited in claim 1, wherein displaying the radar chart includes allowing the user to choose where to display the radar chart.

11. The method as recited in claim 1, further comprising allowing users to alter the length of a spoke in the radar chart.

12. The method as recited in claim 1, further comprising allowing users to color the star in the radar chart.

13. A system for displaying search results according to customizable relevancy criteria, comprising a display device and a processor configured to:
- receive search results;
- allow a user to select relevancy criteria to be applied to search result scores;
- applying a color designation to the search result scores, wherein the color designation includes one from the group comprising giving equal weight to each selected criterion, assigning more weight to a particular criterion, and assigning less weight to a particular criterion;
- for a search result, receive information about search result scores according to the selected criteria;
- use the selected relevancy criteria to create a spoke in a radar chart;
- associate the search result scores with the spokes in the radar chart;
- create a start in the radar chart based on the association of search result scores with the spokes;
- display the radar chart on the display using a color selected according to the color designation; and
- modify the displayed radar chart, wherein modifying the displayed radar includes one from the group comprising suppressing a spoke and adding a spoke.

14. A computer program product for displaying search results according to customizable relevancy criteria, comprising a non-transitory computer readable medium having program instructions embodied therein for:
- receiving search results;
- allowing a user to select relevancy criteria to be applied to the search result scores; applying a color designation to the search results, wherein the color designation includes one from the group comprising giving equal weight to each selected criterion, assigning more weight to a particular criterion, and assigning less weight to a particular criterion;
- for a search result, receiving information about search result scores according to a plurality of criteria;
- using each of the plurality of criteria to create a spoke in a radar chart;
- associating the search result scores with the spokes in the radar chart;
- creating a star in the radar chart based on the association of search result scores with the spokes;
- displaying the radar chart using a color selected according to the color designation; and
- modifying the displayed radar chart, wherein modifying the displayed radar includes one from the group comprising suppressing a spoke and adding a spoke.

* * * * *